US008930506B2

(12) United States Patent
Nguyen et al.

(10) Patent No.: US 8,930,506 B2
(45) Date of Patent: Jan. 6, 2015

(54) SYSTEM AND METHOD FOR AUTOMATICALLY ADDRESSNG DEVICES ON A COMMUNICATION NETWORK

(75) Inventors: Dang Nguyen, South Windsor, CT (US); Jason Armistead, Avon, CT (US); Bradley Scoville, Terryville, CT (US); Ming Martin Fang, Shanghai (CN)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 13/258,345

(22) PCT Filed: Jun. 5, 2009

(86) PCT No.: PCT/US2009/046377
§ 371 (c)(1),
(2), (4) Date: Sep. 21, 2011

(87) PCT Pub. No.: WO2010/141026
PCT Pub. Date: Dec. 9, 2010

(65) Prior Publication Data
US 2012/0066356 A1    Mar. 15, 2012

(51) Int. Cl.
*G06F 15/177* (2006.01)
*H04L 29/12* (2006.01)
*H04L 29/08* (2006.01)

(52) U.S. Cl.
CPC ...... *H04L 29/12254* (2013.01); *H04L 61/2092* (2013.01); *H04L 61/2038* (2013.01); *H04L 29/12981* (2013.01); *H04L 67/12* (2013.01); *H04L 29/1232* (2013.01); *H04L 61/609* (2013.01)
USPC ........................................ 709/220

(58) Field of Classification Search
CPC ... H04L 67/12; H04L 61/2038; H04L 61/609; H04L 29/12254
USPC ........................................ 709/220; 187/247
See application file for complete search history.

(56) References Cited

U.S. PATENT DOCUMENTS

| 5,551,053 A | 8/1996 | Nadolski et al. |
| 5,675,830 A | 10/1997 | Satula |
| 5,914,957 A | 6/1999 | Dean et al. |
| 5,946,321 A | 8/1999 | Dean |

(Continued)

FOREIGN PATENT DOCUMENTS

| EP | 1284556 A1 | 2/2003 |
| JP | H07046258 A | 2/1995 |

(Continued)

OTHER PUBLICATIONS

The International Search Report and Written Opinion for International Application No. PCT/US2009/046377 filed Jun. 5, 2009.

(Continued)

*Primary Examiner* — Vivek Srivastava
*Assistant Examiner* — Karina J Garcia-Ching
(74) *Attorney, Agent, or Firm* — Cantor Colburn LLP (57) ABSTRACT

A system and method automatically assigns unique addresses to devices connected on a communication bus based on the parameters measured by each device. Assignment of addresses may be provided centrally by a controller or may be distributed, in which each device negotiates with other devices to assign unique addresses to each device.

18 Claims, 9 Drawing Sheets

(56) References Cited

U.S. PATENT DOCUMENTS

| | | | |
|---|---|---|---|
| 6,349,795 B1 * | 2/2002 | Tatsumi et al. | 187/247 |
| 6,363,083 B1 | 3/2002 | Spielbauer et al. | |
| 6,392,558 B1 | 5/2002 | Schulmeyer et al. | |
| 2006/0088044 A1 | 4/2006 | Hammerl | |
| 2008/0008179 A1 | 1/2008 | Chen et al. | |

FOREIGN PATENT DOCUMENTS

| | | |
|---|---|---|
| JP | H11214166 A | 8/1999 |
| JP | 2000-201162 A | 7/2000 |
| JP | 2005051507 A | 2/2005 |
| KR | 20090033577 A | 4/2009 |
| WO | WO03041379 A1 | 5/2003 |

OTHER PUBLICATIONS

The Office Action and English Translation of the Office Action in related Korean Patent Application No. 10-2011-7031018.

Japanese Office Action from Application No. JP2012-513918, dated Jul. 23, 2013, four pages.

* cited by examiner

SYSTEM AND METHOD FOR AUTOMATICALLY ADDRESSNG DEVICES ON A COMMUNICATION NETWORK

BACKGROUND

The present invention relates to communication networks, and in particular to a system and method for automatically assigning addresses to devices connected on a communication network.

Communication networks allow devices to communicate with one another. Each device has a unique identification or address that allows a controller to associate messages on the network with a particular device. In some applications, such as in communication networks employed on elevators, the controller maintains a mapping that associates each address with physical and/or functional attributes associated with the device. For example, a device on the network may be a hall call button located on a particular floor (physical location) that is responsible for communicating to the controller when a elevator call has been made (function). Typically, the controller is programmed to associate each device with a particular physical location (e.g., floor).

Installation of this type of system is tedious, as a technician must assign a unique physical address to each device and map each assigned physical address to a physical location at which the device will be installed. Testing is similarly tedious, as it requires a technician to visit each floor to ensure that activating the call button on that floor results in the controller sending the elevator cab to the correct floor.

SUMMARY

In a message-based communication network, addresses representing a physical location of devices connected on the network are automatically assigned based on a parameter measured by each device, wherein the parameter measured by each device varies based on the physical location of the device. The measured parameter is communicated and addresses are assigned based upon the measured voltage magnitude.

DETAILED DESCRIPTION

The present invention provides a system and method for automatically assigning addresses to devices communicating on a communication network. By monitoring parameters that vary as a function of the physical location of each device, the present invention is able to determine the physical location of each device and can assign a physical address to each device based on the determined physical location. The term 'physical location' refers to both absolute physical locations of devices (e.g., global positioning system (GPS) coordinates) and/or relative physical locations (e.g., locations of devices relative to one another). The term 'physical address' refers to an address (e.g., network address, etc.) assigned to particular device based on its physical location. Subsequent messages from a device are identified as originating from a particular physical location based on the physical address identifies the locations physical location from which the message originated.

The operation of the present invention is described with respect to a particular embodiment, in which the monitored parameter is the magnitude of the voltage supplied by a power supply to each device. The magnitude of the voltage decreases the further each device is from the power supply. Thus, the monitored parameter varies with a physical location of the device. In other embodiments, other parameters that vary based on the physical location of a device may be employed, such as current, barometric pressure, global positioning system (GPS) coordinates, temperature, radio frequency (RF) power reception (RSSI), and other parameters that vary with location.

Figure 1:
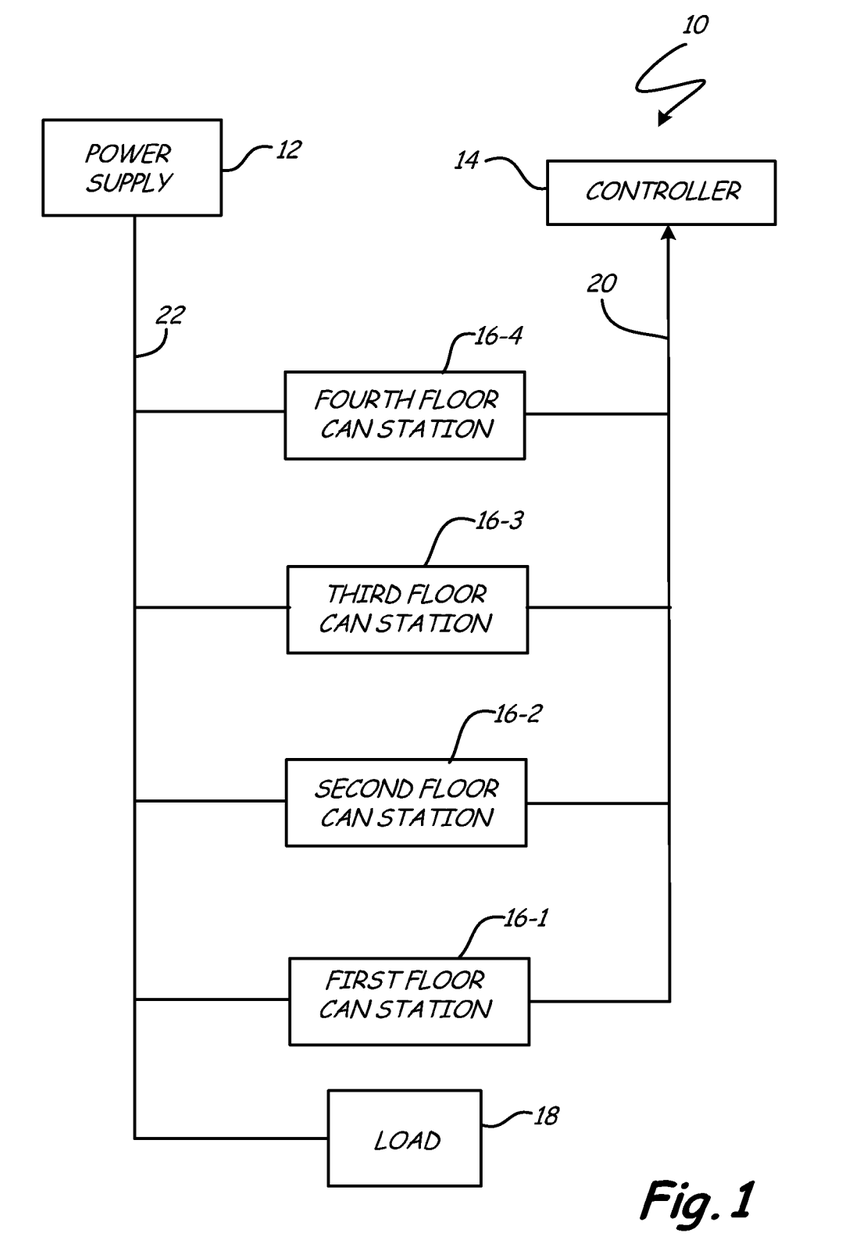
FIG. 1 is a block diagram illustrating a communication network according to an embodiment of the present invention.

FIG. 1 is a block diagram illustrating communication network 10 according to an embodiment of the present invention. Communication network 10 includes power supply 12, controller 14, controller-area network (CAN) stations 16-1, 16-2, 16-3 and 16-4. (collectively, CAN stations 16), load 18, CAN bus 20, and power supply bus 22. In this embodiment, communication network 10 is deployed in an elevator application in which each CAN station 16 represents a fixture or device, such as a call button, located on a different floor of a building. In other embodiments, communication network 10 may be deployed in any application in which determining the physical location of devices on the CAN network is required to initialize the network. In the embodiment shown in FIG. 1, a CAN-type network is employed, although in other embodiments any type of message-based communication protocol may be employed.

CAN stations 16 receive power from power supply bus 22 and send/receive messages to/from controller 14 via CAN bus 20. Messages communicated by CAN stations 16 include a CAN identifier portion of the CAN station sending the message as well as a data portion. In addition to communicating with controller 14, CAN stations 16 may also communicate with one another via CAN bus 20.

Each CAN station 16 is connected in parallel with other CAN stations on power supply bus 22. However, each CAN station 16 is separated from adjacent CAN stations by a length of cable having a resistance defined by the distance between adjacent CAN stations and the gauge of the wire. Although connected in parallel with one another, the resistance of the wire results in a voltage drop between adjacent CAN stations 16. The magnitude of the voltage drop is based on the current drawn by the plurality of CAN stations and the resistance of the wire separating adjacent CAN stations. As a result, the magnitude of the voltage provided to each CAN device 16 decreases with respect to the distance each CAN station 16 is located from power supply 12. For instance, the magnitude of the voltage provided to CAN device 16-4 is greater than the magnitude of the voltage provided to CAN device 16-3, due to the voltage drop associated with the wires connecting the adjacent devices. In one embodiment, load 18 is connected to the end of power supply bus 22 to draw additional current, and therefore increase the voltage differences between adjacent CAN stations 16. Depending on the precision with which each CAN station 16 can measure the voltage magnitude, load 18 may be needed to measure voltage magnitudes that can be differentiated from one another. After voltage magnitudes have been measured by each device, load 18 may be disconnected to prevent excessive energy consumption of the system. Load 18 may be physically removed or may be automatically disconnected by one of the CAN stations 16.

In other embodiments, parameters that vary with location other than voltage may be monitored or measured by each CAN station 16, such as current, barometric pressure, global positioning system (GPS) coordinates, temperature, radio frequency (RF) power reception (RSSI), and other parameters that vary with location.

Each CAN station 16 includes an analog-to-digital converter (ADC, shown in FIG. 2) that translates the analog voltage value received from power supply 12 to a digital signal that can be communicated as part of a message to other devices and/or controller 14 via CAN bus 20.

Automatically assigning physical addresses (e.g., floor numbers) to CAN station 16 requires each device to measure the magnitude of the voltage provided by power supply 12. In isolation, the voltage magnitude measured by each CAN station 16 is insufficient to determine the location of CAN station 16 (i.e., the physical address of the device). In one embodiment, each CAN station 16 communicates the measured voltage magnitude to controller 14, which collects the various voltage magnitudes provided by each of the plurality of CAN stations 16 and determines based on a comparison of the measured voltage magnitudes the physical location of each CAN station 16. Controller 14 associates a network address with determined physical locations of each CAN station 16 and communicates the assigned network address to each CAN station 16, thereby providing automatic addressing of communication network 10.

In another embodiment, physical addresses are assigned in a distributed manner, with each CAN station 16 communicating with other CAN stations to determine the address of each (as described in more detail with respect to FIGS. 5A-5E).

Figure 2:
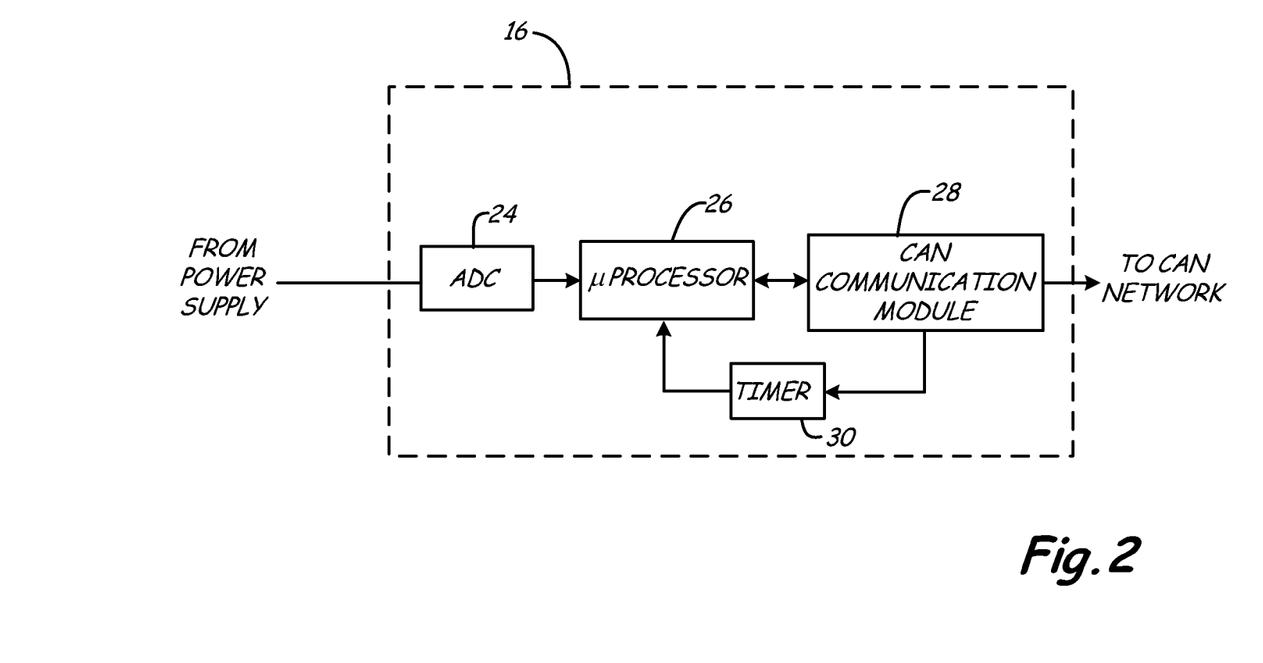
FIG. 2 is a block diagram illustrating components included within each controller area network (CAN) station according to an embodiment of the present invention.

FIG. 2 is a block diagram illustrating components included within CAN station 16 according to an embodiment of the present invention. Components include analog-to-digital converter (ADC) 24, microprocessor 26, CAN communication module 28, and timer 30.

CAN station 16 is operably connected to receive power from power supply 12 and provides digital communication via CAN network bus 20. ADC 24 is connected to monitor the magnitude of the voltage (an analog input) provided to CAN station 16 and converts the analog input to a digital value that is provided to microprocessor 26. CAN communication module 28 communicates bi-directionally with microprocessor 26 and is operably connectable to send/receive messages on communication bus 20. Timer 30 is a digital timer that is selectively initiated based on messages sent/received by CAN communication module 28 and provides a timed input to microprocessor 26. In this way, CAN station 16 is capable of measuring the magnitude of the power supply voltage provided via power supply bus 22, convert the measured analog voltage to a digital value for communication onto communication bus 20.

Figure 3:
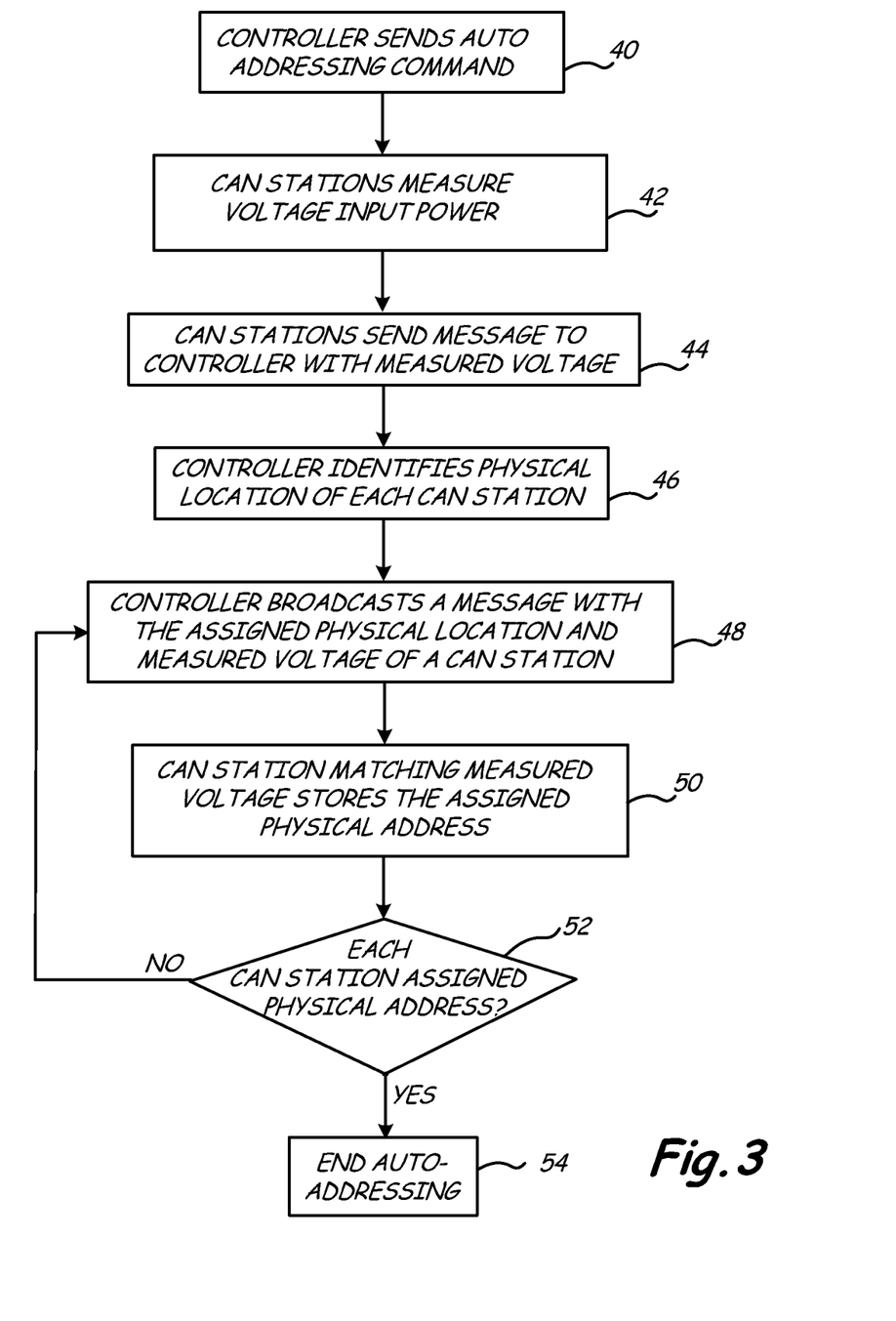
FIG. 3 is a flowchart illustrating centralized initialization and address assignment of CAN stations according to an embodiment of the present invention.

FIG. 3 is a flowchart illustrating a centralized method of automatically assigning physical locations to each CAN station 16 according to an embodiment of the present invention. The flowchart is described with respect to communication network 10 as shown in FIG. 1.

At step 40, controller 14 operates in an automatic addressing mode in which a message is communicated to each CAN station 16 connected on communication bus 20 to measure the input voltage provided at each CAN station 16 by power supply bus 22. Controller 14 may initiate the automatic addressing automatically upon initialization, or may be manually placed into an automatic addressing mode.

At step 42, in response to the addressing message sent by controller 14, each CAN station 16 measures the respective voltage magnitude provided by power supply bus 22. The sensed voltage is converted to a digital signal by ADC 24 (as described in FIG. 2) that can be communicated as part of a message from CAN station 16 to controller 14 via communication bus 20.

At step 44, each CAN station 16 communicates the measured voltage magnitude to controller 14. In one embodiment, after sending the message to each CAN station 16 requesting voltage measurements, controller 14 waits a set amount of time for responses from the plurality of CAN stations 16. In one embodiment the order in which each CAN station communicates is based on the magnitude of the measured voltage. The voltage magnitude measured by each CAN station 16 varies based on the distance of the CAN station from power supply 12. Dictating the order in which each CAN station communications based on the voltage magnitude measured by each CAN station 16 results in each CAN station communicating at a different time.

At step 46, controller 14 identifies the physical location (e.g., floor location) of each CAN station 16-1, 16-2, 16-3 and 16-4 based on the voltage magnitudes communicated by each CAN station 16. This determination may be based on prior information regarding, for example, the total number of floors associated with a building, whether power is provided from the first floor to the top floor (or in reverse order from the top floor to the first floor), etc.

At step 48, controller 14 broadcasts (i.e., sends to all CAN stations) a message that identifies a particular CAN station (e.g., CAN station 16-1) by the voltage measurement provided by the CAN station, along with the physical address assigned to the particular CAN station. For instance, controller 14 may send a message that includes a voltage magnitude of 14.76 volts and an identified physical location associated with the first floor.

At step 50, the CAN station (e.g., CAN station 16-1) that measured a voltage magnitude corresponding with the voltage magnitude broadcast by controller 14 accepts the physical location identified by controller 14. The CAN station associated with the corresponding voltage magnitude stores the physical location to memory and replies to controller 14 indicating the acceptance of the identified physical location. Subsequent messages provided by the CAN station will include the assigned physical location. For instance, if CAN station 16-1 is a hall call button, subsequent messages provided by CAN station 16-1 will indicate the function provided by the station (i.e., hall call) as well as the location of the call (i.e., first floor).

At step 52, controller 14 determines whether all identified physical locations have been communicated. If additional physical locations must be communicated, then flow proceeds back to step 48 and controller 14 broadcasts another message that identifies another particular CAN station (e.g., CAN station 16-2) by the voltage measurement provided by the CAN station along with a particular address assigned to the CAN station by controller 14. If all physical addresses have been assigned, then flow proceeds to step 54, in which controller 14 exits from the automatic addressing mode. This may be done automatically by the controller or may be done manually by an operator in response to an indication provided by controller 14 that all physical addresses have been assigned.

Figure 4:
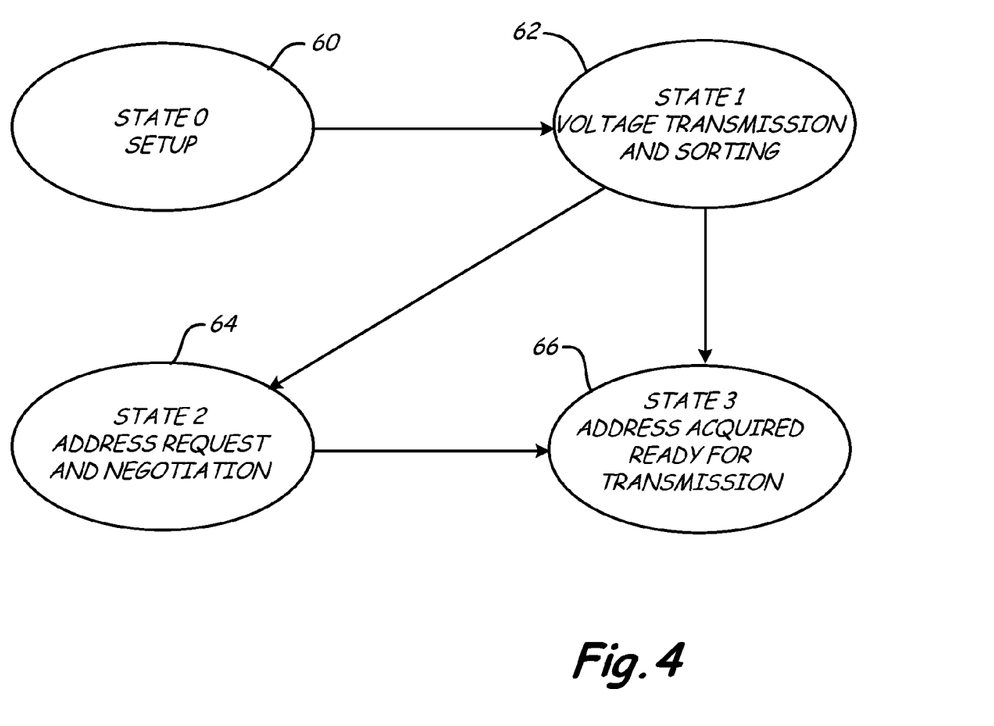
FIG. 4 is a state diagram illustrating various communication states associated with each CAN station and allowed transitions between each state.
Figure 5A:
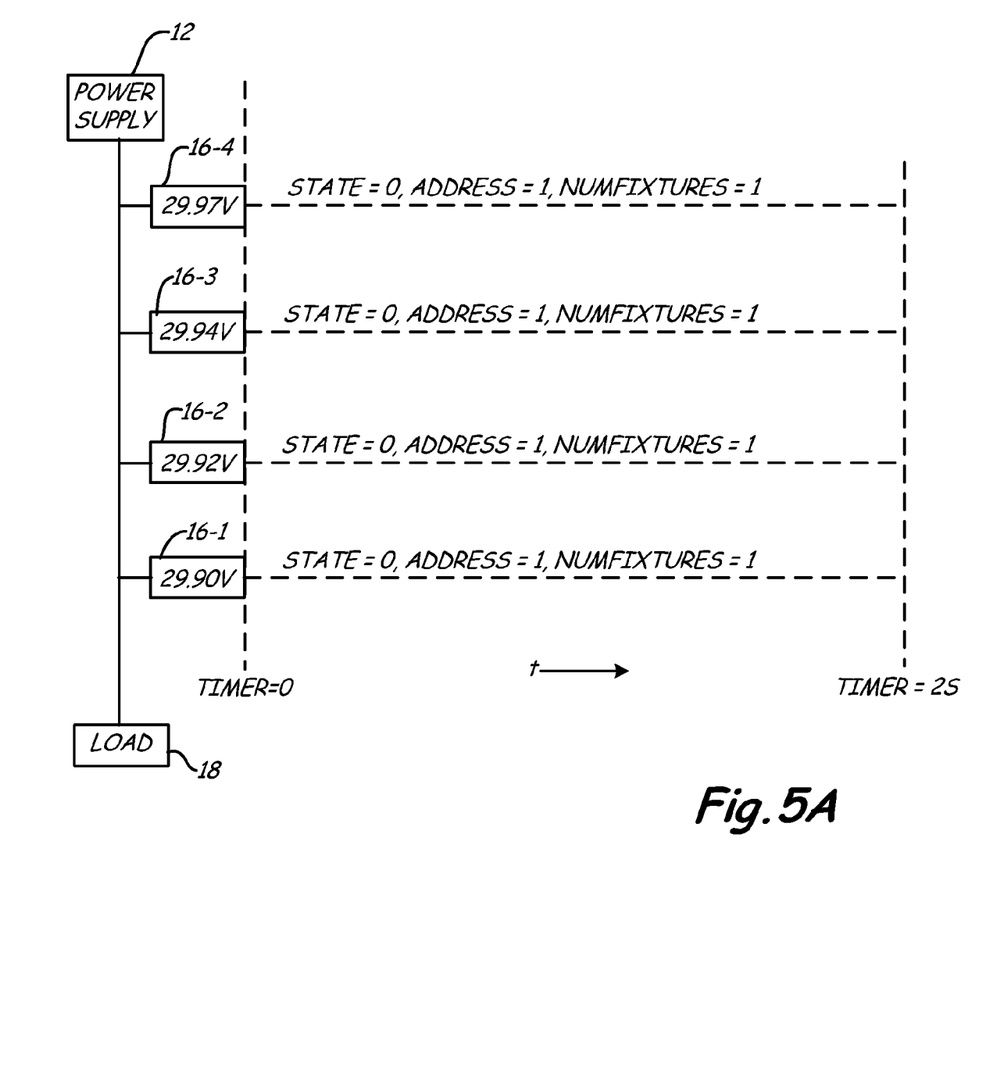
FIGS. 5A-5E are timing diagrams illustrating distributed initialization and address assignment of CAN stations according to an embodiment of the present invention.
Figure 5B:
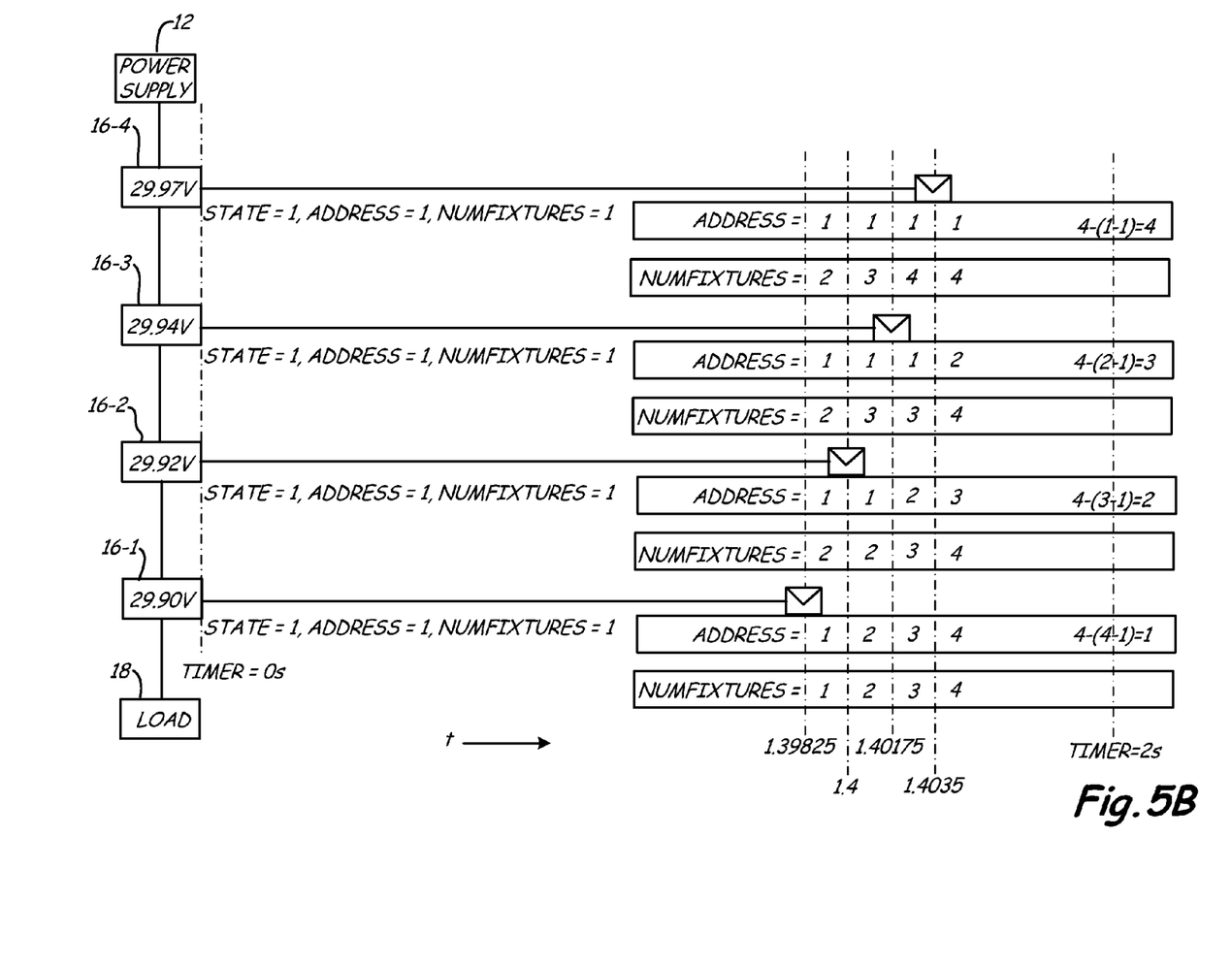
Figure 5C:
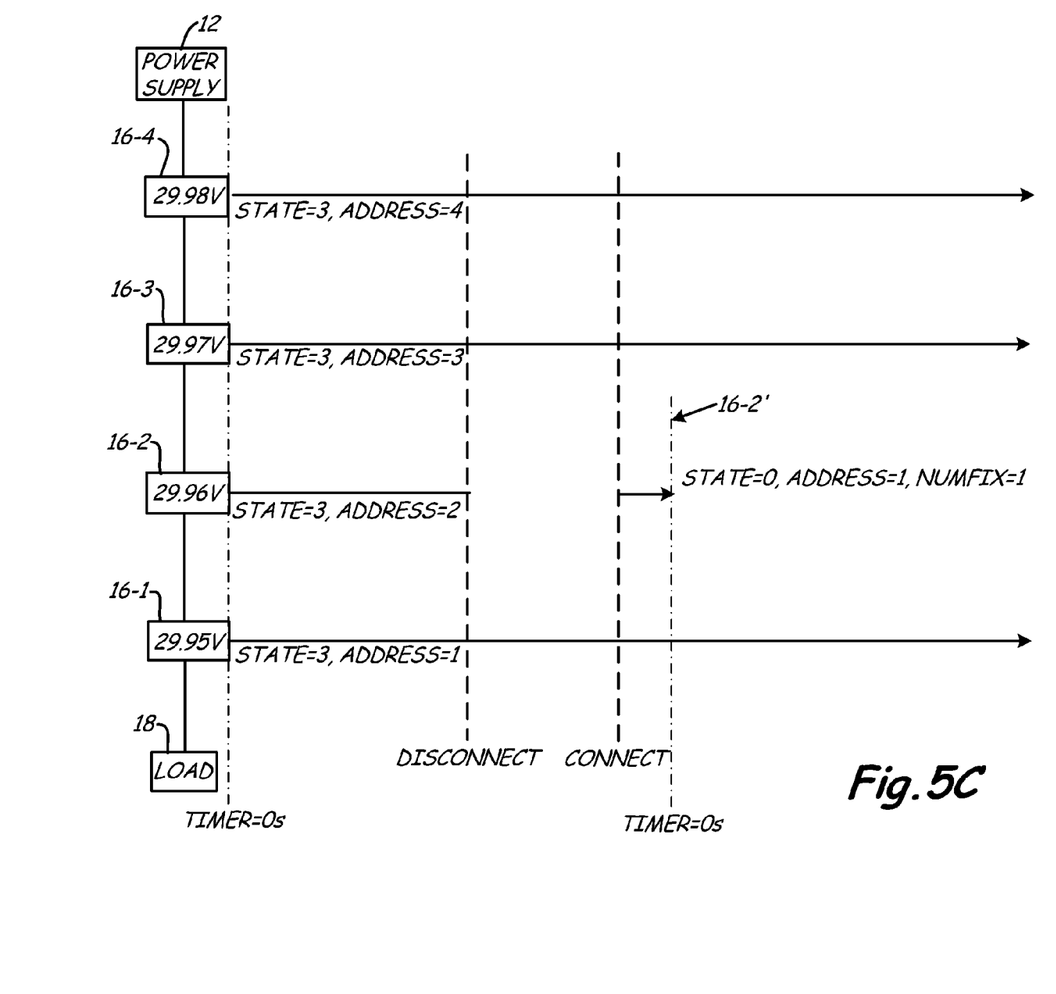
Figure 5D:
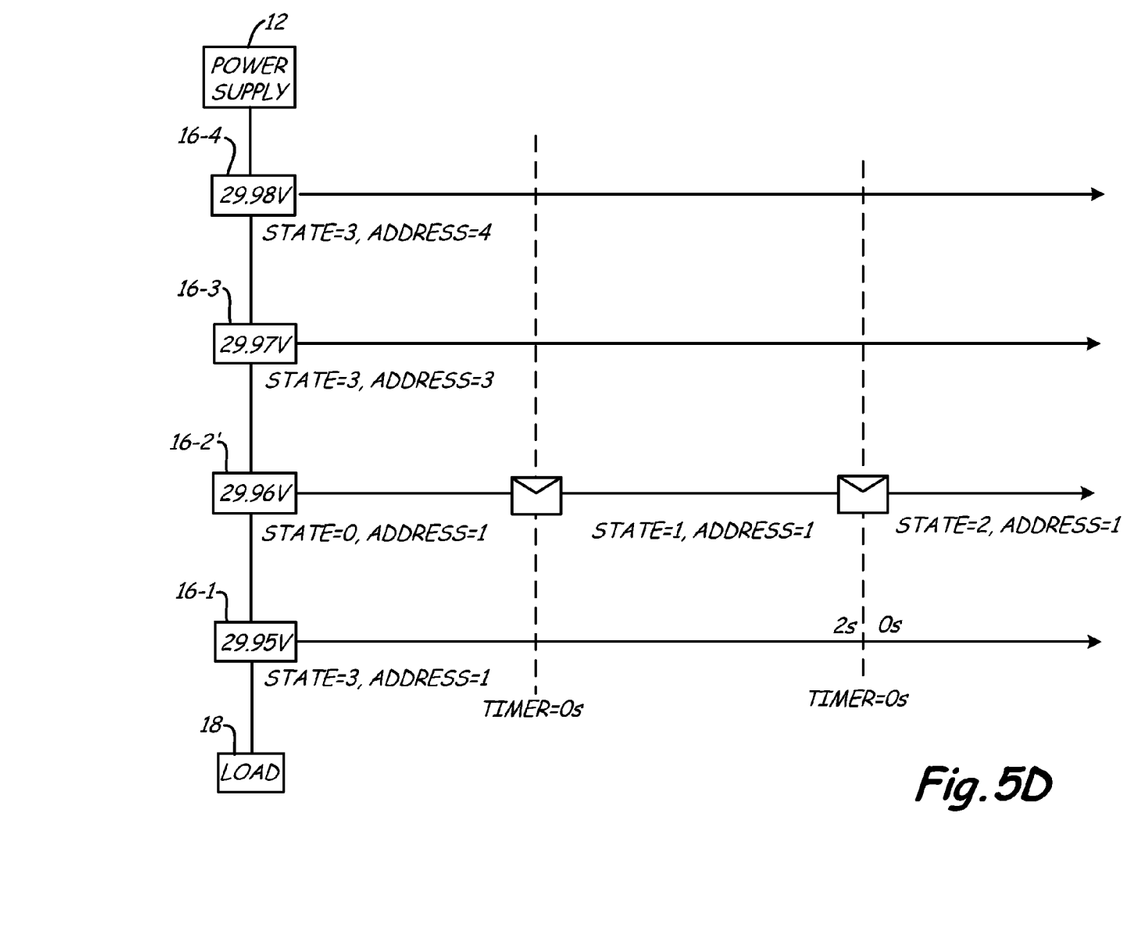
Figure 5E:
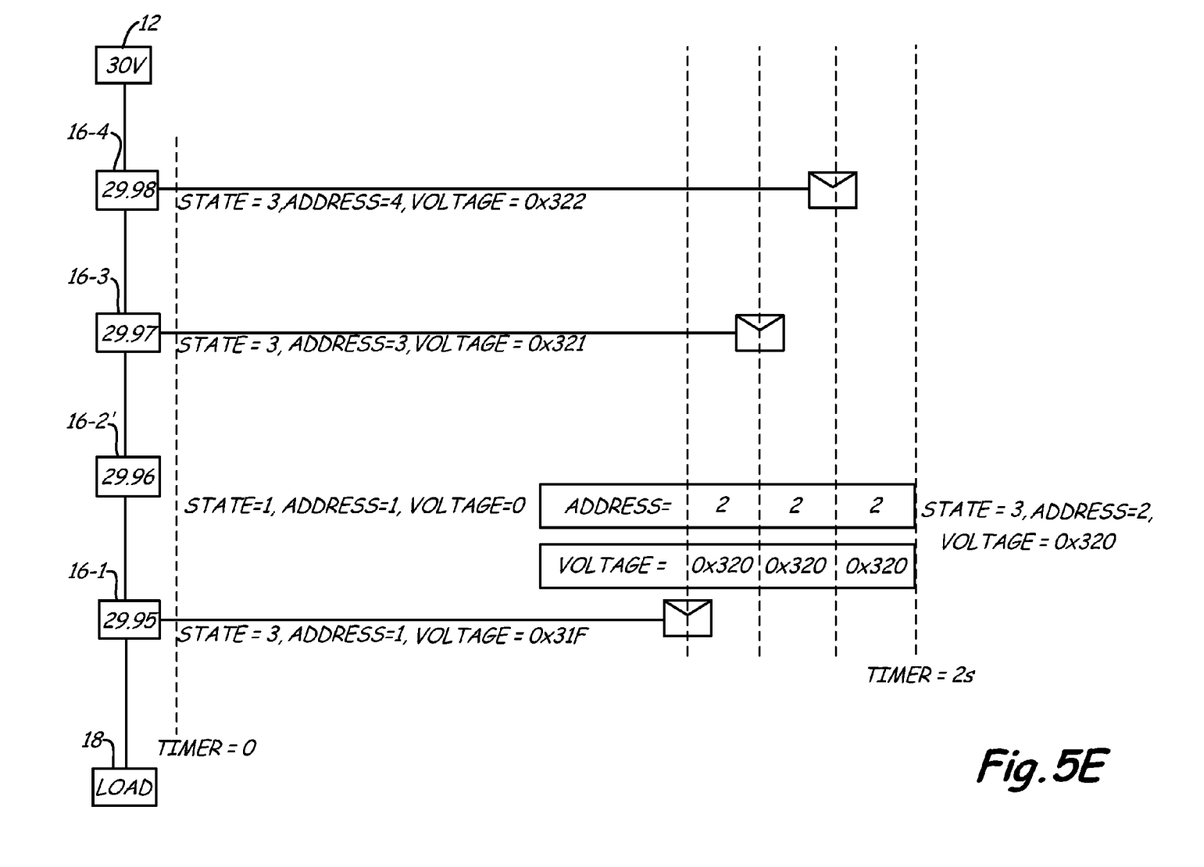

FIGS. 4-5E describe a distributed embodiment in which CAN stations 16, without intervention from controller 14, automatically determine physical locations of each CAN station relative to one another and assign physical addresses based on these determinations.

FIG. 4 is a state diagram illustrating operating states of CAN stations 16 according to an embodiment of the present invention. Each CAN station operates in only one state at any given time, with allowed transitions between various states being illustrated by the arrows connecting each state to one or more adjacent states. In this embodiment, CAN station 16 operates in one of four states, labeled State 0, State 1, State 2, and State 3.

State 0 is a setup mode, State 1 is a voltage transmission and sorting mode, State 2 is an address request and negotiation mode, and State 3 is a ready for transmission mode (i.e., address acquired). CAN stations 16 transition from the setup mode (State 0) to the voltage transmission and sorting mode (State 1). From State 1, CAN stations transition either to the address request and negotiation state (State 2, as is typical during initial installation) or to the address acquired mode (State 3). State 3 represents the state in which the CAN station has been assigned an address and is ready to communicate or send its address to a reinitialized fixture. From State 3, CAN stations do not transition to any other states unless the system is restarted, in which case each CAN station is re-initialized to State 0. The operation of CAN station 16 and various state transitions are described in more detail with respect to FIGS. 5A-5E.

FIG. 5A is a timing diagram illustrating the connection of CAN stations 16-1, 16-2, 16-3 and 16-4 to power supply 12 (as shown in FIG. 1) as well as the relative distance of each CAN station 16 to power supply 12 and the resulting voltage magnitude measured by each CAN station. For instance, CAN station 16-1 is located furthest from power supply 12 and CAN station 16-4 is located nearest to power supply 12. In addition, FIG. 5A illustrates internal variables maintained by each CAN station 16 with respect to current state, assigned physical address and count of number of fixtures (i.e., CAN stations).

For example, in FIG. 5A each CAN station 16 is operating in the initialization mode (State 0), has a stored physical address equal to '1' and a count of the number of fixtures or CAN devices operating on the network equal to '1'. In this embodiment, upon providing power to CAN stations 16, each device begins operating in the initialization mode (State 0) during which time each CAN station 16 measures the magnitude of the voltage provided by power supply 12. In this embodiment, CAN station 16-1 is furthest from power supply 12 and as a result measures the lowest voltage magnitude (e.g., 29.90 volts), CAN station 16-2 measures the second lowest voltage magnitude (e.g., 29.92 volts), CAN station 16-3 measures the third lowest voltage magnitude (e.g., 29.94 volts) and CAN station 16-4, being closest to power supply 12, measures the highest voltage magnitude (e.g., 29.97 volts).

Each CAN station 16 includes internal timer 30 (as shown in FIG. 2) that is used to determine when to transition from the initialization state (state 0) to the voltage transmission and sorting state (state 1). In this embodiment, CAN stations 16 are programmed to make each transition after two seconds. In other embodiments, CAN stations 16 may enter the initialization mode at the request of controller 14, but provide without further intervention from controller 14 the automatic assignment of physical addresses.

FIG. 5B is a timing diagram illustrating CAN stations 16 as described with respect to FIG. 5A, following the transition of CAN stations 16 from the initialization state (state 0) to the voltage transmission and sorting state (state 1). In particular, FIG. 5B illustrates the ordered method by which each CAN station 16 communicates measured voltage magnitudes to other CAN stations 16 connected on communication bus 20. In this embodiment, each CAN station 16 multiples the measured voltage magnitude by a constant value to determine the time at which each CAN stations 16 will communicate, wherein the CAN station (e.g., CAN station 16-1) with the lowest measured voltage magnitude communicates first and the CAN station (e.g., CAN station 16-4) with the highest measured voltage magnitude communicates last. For example, CAN station 16-1 is scheduled to communicate first at 1.39825 seconds, CAN station 16-2 communicates next at 1.40 seconds, CAN station 16-3 communicates at 1.40175 seconds, and CAN station 16-4 communicates at 1.4035 seconds.

In response to a communication provided by a CAN station (e.g., CAN station 16-1) including the measured voltage magnitude sensed by the sender CAN station, each CAN station that did not send the message (e.g., CAN stations 16-2, 16-3, and 16-4) receives the message and determines based on a comparison of the communicated voltage magnitude with its own measured voltage magnitude whether it should adjust its physical address. In addition, each CAN station may also include a count of the number of fixtures (e.g., CAN stations) connected on communication bus 20 that may be incremented based on received communications from other CAN stations 16.

For example, CAN station 16-1 measured the lowest voltage magnitude and therefore communicates first at 1.39825 seconds. The message is received and processed by CAN stations 16-2, 16-2 and 16-4. In this embodiment, CAN stations 16-2, 16-3, and 16-4 each have measured voltage magnitudes that exceed the voltage magnitude measured and communicated by CAN station 16-1. As such, none of these CAN stations increment their stored physical address, leaving each physical address unchanged at a value of '1'. However, in response to the received communication, each of the CAN stations that received the message (e.g., CAN station 16-2, 16-3, and 16-4) increment their respective counts of the number of the number of connected fixtures (e.g. Num Fixtures=2).

CAN station 16-2 measured the next lowest voltage magnitude, and therefore communicates next at 1.4 seconds. Once again, the communication from CAN station 16-2 includes the voltage magnitude measured by CAN station 16-2 (e.g., 29.92 Volts). CAN stations 16-1, 16-3 and 16-4 receive the communication and compare the communicated voltage magnitude with their own measured voltage magnitudes to determine whether to increment their physical addresses. For example, CAN station 16-1 compares its measured voltage magnitude (29.90 V) with the voltage magnitude provided by CAN station 16-2 (e.g., 29.92 V). Because the voltage magnitude measured by CAN station 16-2 is greater than the voltage magnitude measured by CAN station 16-1, the physical address stored by CAN station 16-1 is incremented by one from one to two. CAN stations 16-3 and 16-4, both of which have measured voltage magnitudes greater than that of CAN station 16-2, do not increment their respective physical addresses. However, each of the CAN stations 16-1, 16-3 and 16-4 that received the communication increment their counts of the number of fixtures (e.g. Num Fixtures='3' for CAN stations 16-3 and 16-4).

CAN station 16-3 measured the next lowest voltage magnitude (e.g., 29.94), and therefore communicates next at 1.40175 seconds. Once again, the communication from CAN station 16-3 includes the voltage magnitude measured by CAN station 16-3 (e.g., 29.94 Volts). CAN stations 16-1, 16-2 and 16-4 receive the communication and compare the voltage magnitude with their own measured voltage magnitudes to determine whether to increment their physical addresses. As a result, CAN stations 16-1 and 16-2, both of which measured voltage magnitudes less than that CAN station 16-3, increment their physical addresses by one. However, the physical address of 16-4 remains unchanged because the voltage magnitude measured by CAN station 16-4 exceeds that measured by CAN station 16-3. Likewise, the CAN stations 16-1, 16-2 and 16-4 each increment their counts of the number of fixtures. (e.g., Num Fixtures='4' for all CAN stations).

CAN station 16-4 measured the next lowest voltage magnitude (e.g., 29.97 V) and therefore communicates last at 1.4035 seconds. CAN stations 16-1, 16-2, and 16-3, each of which have measured voltage magnitudes less than that of CAN station 16-4 increment their physical addresses. As a result of the distributed voltage sorting performed by CAN stations 16-1, 16-2, 16-3 and 16-4, each CAN station now has a unique physical address. In this case, the physical address associated with each fixture proceeds in descending order from the first floor (e.g., CAN station 16-1) to the top floor (e.g., CAN station 16-4). In the embodiment shown in FIG. 5B, the physical addresses of each CAN station 16 are reversed such that the physical addresses in ascending order from the first floor to the top floor. Based on knowledge of the total number of fixtures maintained by each CAN station, the correct physical address is assigned by subtracting from the total count of fixtures maintained by each CAN station, the result of subtracting one from the physical address maintained by the CAN station (i.e., NumFixtures−(Physical_Address−1)). In other embodiments, based on the application and the location of the power supply, this step may not be needed. As a result of the voltage sorting and post-processing provided by each CAN station 16, a physical address is assigned to each CAN station 16 that corresponds with the physical location (e.g., floor) of the respective CAN station. As shown to the far right-side of FIG. 5B, CAN stations 16 each transition from the sorting state (state 1) to ready state (state 3) at time equals two seconds.

FIG. 5C is a timing diagram illustrating CAN stations 16 as described with respect to FIGS. 5A and 5B, following the transition of CAN stations 16 from the sorting state (state 1) to the ready state (state 3). FIG. 5C also illustrates the disconnection of CAN station 16-2 and 'hot plug-in' of a new CAN station 16-2' to illustrate how a single CAN station acquires the correct physical address.

At a time of zero seconds, (assuming reset of the timer following the transition) each CAN station 16 is operating in the ready state (state 3). In this state, each CAN station 16 has been assigned a physical address and is ready to communicate with controller 14. Messages provided by a CAN station 16 would include the physical address associated with the communicating CAN station 16 to allow controller 14 to identify the location (e.g., floor) from which the message originated. CAN station 16-2 is powered down and disconnected from the network (labeled 'disconnect'), and a new CAN station 16-2' is connected and powered up at a subsequent time (labeled 'connect'). This is commonly referred to as a 'hot plug-in', in which a device is replaced while the remainder of the network remains connected and operational.

Upon being connected to the network, CAN station 16-2' acquires the bit rate associated with the communication bus. Having successfully acquired the bit rate, CAN station 16-2' operates in the initialization state (state 0), in which physical address and a count of the number of fixtures are defaulted to a value of one. As before, CAN station 16-2' includes a timer that is used to dictate the transition between states, with CAN station 16-2' operating in each state for an arbitrarily selected time period of two seconds. During the initialization state (state 0), CAN station 16-2' measures the magnitude of the voltage provided on power bus 22 and converts the analog value to a digital value.

FIG. 5D is a timing diagram illustrating the transition of CAN station 16-2' from the initialization state (state 0) to the voltage transmission and sorting state (state 1). As described with respect to FIG. 5B, during the voltage sorting state CAN station 16-2' calculates based on the measured voltage magnitude a time for CAN station 16-2' to communicate to other CAN stations its measured voltage. At the appointed time, CAN station 16-2' communicates the measured voltage magnitude. However, unlike in FIG. 5B, the other CAN stations 16-1, 16-3 and 16-4 are operating in the ready state (state 3), and therefore do not respond to the communication provided by CAN station 16-2' and do not provide their own communications regarding their measured voltage magnitudes. Following the timer maintained by CAN station 16-2' reaching a count of two seconds (signaling the expected transition of CAN station 16-2' to the next state), without CAN station 16-2' having received transmission from any of the other CAN stations, CAN station 16-2' transitions from the voltage sorting state (state 1) to an address request and negotiation state (state 2). In response to transitioning to the negotiation state (state 2), CAN station 16-2' sends an address to all connected CAN stations 16.

FIG. 5E is a timing diagram illustrating the operation of CAN station 16-2' during the negotiation state (state 2), in response to the request for addresses sent to connected CAN stations 16. In contrast with the voltage sorting mode (state 1), in the negotiation mode (state 2), the newly added CAN station 16-2 is assigned a physical address based not on the measured voltage magnitude but rather on the lowest address that is currently unoccupied. In response to the address request, each connected CAN station 16 sends an ordered communication that includes the physical address assigned to the CAN station as well as the measured voltage magnitude associated with the CAN station.

The ordered communication provided by each CAN station (except the CAN station operating in the negotiation state) is determined based on the measured voltage magnitudes stored by each CAN station 16. As such, CAN station 16-1 communicates first, CAN station 16-3 communicates next, and CAN station 16-4 communicates last. With each communication, CAN station 16-2' compares the address provided in the communication to its own address. If the address provided in the communication matches the address stored by CAN station 16-2', then the newly added CAN station 16-2' increments its physical address by one and similarly increments its stored digital value of the measured voltage to be one greater than the communicated voltage magnitude (e.g., digital value 0x31F incremented to 0x320). With respect to a communication from CAN station 16-1, CAN station 16-2' compares physical addresses and because both are equal to '1' increments stored physical to '2'.

The same process is performed for subsequent communications from CAN stations 16-3 and 16-4. For example, a communication from CAN station 16-3 includes a physical address of '3'. However, because the physical address provided by CAN station 16-3 is greater than the physical address of CAN station 16-2' (e.g., 2), the physical address of CAN station 16-2' remains unchanged, as does the stored magnitude of the measured voltage. Following the expiration of the timer (i.e., timer equaling two seconds), CAN station 16-2' transitions from the negotiation state (state 2) to the ready state (state 3). At this point, all CAN station 16 are operating in the ready state (state 3) and each is assigned a unique physical address that identifies the location (e.g., floor) associated with the CAN station.

The present invention provides a system and method of automatically assigning unique addresses to devices connected on a communication bus based on the voltage magnitudes measured by each device. Assignment of addresses may be provided centrally by a controller or may be distributed, in which each device negotiates with other devices to assign unique physical addresses to each device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for automatically assigning addresses to devices connected to a message-based communication network, the method comprising:
   measuring a parameter at each device, wherein the measured parameter is a function of the physical location of the device; and
   communicating the measured parameters from each device at a series of calculated times, wherein the calculated time at which each device communicates its measured parameter is calculated by the device based on a magnitude of the parameter measured by that device;
   assigning addresses to the devices based upon the measured parameters;
   wherein communicating measured parameters includes communicating the measured parameter to a controller; and
   wherein assigning addresses based upon the measured parameters includes:
      receiving measured parameters from each device generating physical addresses for each device based upon the measured parameters; and
      communicating assignment messages for each physical address, wherein the assignment messages include the assigned physical address and the measured parameter associated with the physical address, wherein the device that measured the parameter matching the parameter included within the assignment message stores the corresponding physical address.

2. The method of claim 1, wherein communicating measured parameters includes communicating the measured parameters to each device connected to the message-based communication network.

3. The method of claim 2, wherein assigning addresses based upon the measured parameters includes: receiving a message from each of the devices connected on the message-based communication network, each message including a parameter measured by one of the devices; determining addresses for each device based on a comparison of the parameter measured by each device with parameters received from other devices connected on the message-based communication network; and storing the determined address for inclusion in subsequent messages sent by each device.

4. The method of claim 1, wherein the measured parameter is selected from the group consisting of: voltage magnitude, current magnitude, barometric pressure, global positioning system (GPS) coordinates, temperature, and radio frequency (RF) power reception (RSSI).

5. A method for automatically assigning addresses to devices connected to a message-based communication network, the method comprising:
   sending an auto-addressing message on the network instructing each of the devices connected on the network to execute an auto-addressing protocol;
   receiving from each connected device a message including a parameter measured by the connected device in response to the auto-addressing message, wherein the parameter measured by the connected device is a function of the physical location of the device; and wherein the message sent by each connected device is sent at a time calculated by the connected device based on the parameter measured by the connected device;
   assigning an address to each connected device based on the measured parameter received from each connected device;
   sending an addressing message that includes the assigned address and the measured parameter provided by the device to receive the assigned address;
   wherein communicating parameter measured includes communicating the parameter measured to a controller; and
   wherein assigning addresses based upon the parameter measured includes:
      receiving parameter measured from each device generating physical addresses for each device based upon the parameter measured; and
      communicating assignment messages for each physical address, wherein the assignment messages include the assigned physical address and the parameter measured associated with the physical address, wherein the device that measured the parameter matching the parameter included within the assignment message stores the corresponding physical address.

6. The method of claim 5, wherein sending the addressing message includes: determining whether each assigned address has been included within an addressing message; and sending additional addressing messages until each address has been communicated onto the communication network.

7. The method of claim 5, wherein the measured parameter is selected from the group consisting of: voltage magnitude, current magnitude, barometric pressure, global positioning system (GPS) coordinates, temperature, and radio frequency (RF) power reception (RSSI).

8. A method for automatically assigning addresses to a plurality of devices connected to a message-based communication network, the method comprising:
   measuring, at each device, a local parameter, wherein the local parameter is a function of the physical location of that device;
   calculating, at each device, a time to send a message that includes the measured local parameter, wherein the calculated time of each device is based on a magnitude of the measured local parameter of that device;

sending the message from each of the devices connected on the communication network that includes the local parameter at the calculated time corresponding to that device;

receiving the messages from each of the devices connected on the communication network at a controller, each message including the parameter measured by that device;

determining a unique local address for each device based on a comparison of the measured local parameter received from that device with each of the measured local parameters received from other devices connected on the communication network;

storing the determined local address of each device in a memory associated with that device for inclusion in subsequent messages sent by that local device; and wherein assigning addresses based upon the measured local parameters includes:

receiving measured local parameters from each device generating physical addresses for each device based upon the measured local parameters; and communicating assignment messages for each physical address, wherein the assignment messages include the assigned physical address and the measured local parameter associated with the physical address, wherein the device that measured the local parameter matching the local parameter included within the assignment message stores the corresponding physical address.

9. The method of claim 8, wherein determining a unique local address includes:

comparing the measured parameters received in communications from other devices with the measured local parameter; and incrementing an address value associated with the local device for each measured parameter received from the other devices that is greater than the local measured parameter, wherein the address value following comparisons to each measured parameter received from other devices is the unique local address.

10. The method of claim 8, wherein the measured parameter is selected from the group consisting of: voltage magnitude, current magnitude, barometric pressure, global positioning system (GPS) coordinates, temperature, and radio frequency (RF) power reception (RSSI).

11. A communication device for connection onto a message-based communication network, the device comprising:

a power input for receiving power from a power supply bus;

a communication input for sending and receiving messages to/from a message-based communication bus;

an analog-to-digital converter (ADC) operably connected to the power input to measure a magnitude of the voltage provided by the power supply bus and to convert the measured voltage to a digital value;

a microprocessor operably connected to receive the digital value representing the local measured voltage from the ADC and to receive voltage values provided by other communication devices connected to the message-based communication network, wherein the microprocessor compares the local measured voltage value to the voltage value received from other communication devices to determine a local address of the communication device;

a timer, wherein the microprocessor transitions from an initialization mode in which the microprocessor instructs the ADC to measure the local voltage magnitude to a voltage sorting mode when the timer reaches a first value, and wherein during the voltage sorting mode the microprocessor communicates the local measured voltage value at a time calculated based on the magnitude of the measured voltage and increments an address value based on comparisons of the local measured voltage value to measured voltages received from other devices;

communicating the local measured voltage value to a controller; and assigning addresses based upon the local measured voltage value includes:

receiving the local measured voltage value from each device generating physical addresses for each device based upon the local measured voltage value; and communicating assignment messages for each physical address, wherein the assignment messages include the assigned physical address and the local measured voltage value associated with the physical address, wherein the device that measured the voltage value matching the voltage value included within the assignment message stores the corresponding physical address.

12. The communication device of claim 11, wherein the microprocessor communicates the local measured voltage value to other devices connected on the communication network and increments the local address based on comparisons between the local measured voltage and the voltage values provided by the other communication devices.

13. The communication device of claim 11, wherein the local address value of the device is initialized to a value of one, and is incremented each time a voltage value received from another communication device is greater than the local measured voltage value.

14. The communication device of claim 11, wherein the microprocessor maintains a count of the number of devices connected on the communication network and modifies the local address based on the count of devices.

15. The communication device of claim 11, wherein the communication device is a fixture related to elevator operation, and the physical address assigned to the communication device is related to a floor on which the fixture is located.

16. The communication device of claim 11, wherein the microprocessor transitions from the voltage sorting mode to a ready mode when the timer reaches a second value, wherein during the ready mode the device provides messages on the communication bus that include the local address assigned during the voltage sorting mode.

17. The communication device of claim 16, wherein if the microprocessor does not receive measured voltages from other devices connected on the communication bus during the voltage sorting mode, then the microprocessor transitions to an address negotiation mode in which the microprocessor requests addresses from other devices connected on the network, receives ordered communications from the devices connected on the network that includes addresses assigned to each device, and assigns a local address based on the received communications from the devices connected on the network.

18. The method of claim 8, wherein the calculated time is proportional to the measured parameter.

\* \* \* \* \*